Patented Feb. 26, 1935

1,992,167

UNITED STATES PATENT OFFICE 1,992,167

PROCESS FOR THE MANUFACTURE OF PHENOLS FROM ALKALI ARYLSULPHONATES

Maurice Ernest Bouvier, Lyon, Louis Dominique Bardin, Venissieux, and Jean Jacques Chavan, Lyon, France, assignors to Societe des Usines Chimiques Rhone-Poulenc, Paris, France No Drawing. Application February 20, 1934, Serial No. 712,168. In Great Britain March 20, 1933

12 Claims. (Cl. 260—154)

This invention relates to the preparation of those phenols which are capable of being volatilized with steam, and it constitutes an improved method of carrying out the invention described in our previous application No. 684,558, filed 20 February 1934.

One improvement shown by the present invention as compared with that described in application No. 684,558 is that it provides a means whereby the reaction mass remains fluid during the whole of the process.

Another improvement is that it permits of a considerable reduction in the amount of steam that is required to carry over the phenol formed in the reaction.

The invention described in the specification of application No. 684,558 is based on the fact that phenates in melted, pasty or powdered form are quantitatively hydrolyzed in the anhydrous state, when heated and treated with steam, at normal pressure as well as under reduced pressure and even under a certain excess of pressure above normal, on the condition of removing the phenol formed as it is liberated, by a stream of steam in sufficient quantity.

It is also shown in that specification that the hydrolysis of the phenate by a current of steam can be used to prepare phenols by the direct action of alkali sulphonates on the phenate according to the following reaction:

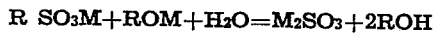

$$R\ SO_3M + ROM + H_2O = M_2SO_3 + 2ROH$$

where R represents an aryl radicle.

This particular method of preparing phenols from the corresponding sulphonates is very economical as it avoids the expensive use of fused caustic alkalies; the alkali phenates can be easily obtained according to the known processes by the action of phenols in the presence of lime on soluble alkali salts (sulphates, sulphites, carbonates).

The present invention relates to an improvement in this method of preparing phenols. It has been ascertained that when one molecule of sulphonate and one molecule of phenate are used, difficulties are encountered in carrying out technically the necessary agitation of the reacting mass and in carrying away the phenol on account of the progressive transformation of the whole mass into powdered alkali sulphite.

According to the present invention these difficulties are avoided by causing the sulphonate to react with an excess of phenate. On account of the presence of an excess of phenate, the reacting mass remains fluid during the whole of the process, with the result that the agitation is rendered very easy and that there is no danger of any of the sulphite being carried away in powder form by the current of steam. Another unexpected advantage resulting from the use of an excess of phenate is that it permits of a considerable reduction in the amount of steam that it required to carry over the phenol formed in the reaction.

The excess of phenate to be used depends on the degree of fluidity which it is desired to maintain. When 2 to 2.5 molecules of phenate are employed to 1 molecule of sulphonate, the product remaining in the apparatus at the end of the process is a mobile liquid containing the sulphite formed in suspension, whereas in using less than 2 molecules of phenate, thicker liquids or pasty masses are obtained. The excess of phenate used is readily separated from the sulphite formed by the known means, for example by dissolving it in a small quantity of water. It can be used again after concentration for the subsequent operations.

The present invention is readily adapted to be carried out in a variety of ways. The alkali sulphonate can, for example be introduced in small portions at a time into the molten phenate while a current of steam is caused to pass through the mass, but one can also pass the steam through a mixture of the molten reacting materials. One can also introduce the two products simultaneously into the reaction vessel either separately or in a mixture, in the solid state or molten or even in the state of concentrated solution; these methods of carrying out the process are particularly suitable for use in a continuous process. In all cases the yield of phenol is very near the theoretical and the proportion of diphenyl oxide formed is very small.

The present invention enables the phenols to be obtained under very economical conditions as it is easy of execution and enables one to avoid any use of fused caustic alkalies. The phenate in excess serving as reaction medium is recovered in practice, the phenol liberated from the phenate by the reaction can be retransformed into alkali phenate by means of soluble alkali salts such as those mentioned above, another quantity of phenol slightly smaller, produced by decomposition of the sulphonate used in the reaction represents the yield of the process.

It is understood that the word phenols in this specification is used in its broad general sense and includes besides phenol itself other phenolic bodies, such as cresols, xylenols and naphthols.

In fact the process is applicable to all phenols which are volatile in steam and which are capable of being produced by the process of fusion of the corresponding alkali sulphonate with alkali hydroxide.

This process may also be advantageously used to effect the transformation of a sulphonate with a phenate corresponding to a different phenol. In that case the reaction proceeds according to the formula:

where R and R₁ represent different aryl radicles the phenol (ROH) derived from the phenate after separation from the phenol (R₁OH) derived from the sulphonate being then re-converted into phenate according to the method already described so that it can then be used again in a fresh cycle of operations.

The following examples are purely illustrative and it is to be understood that the invention is not limited to these examples:

*Example 1.*—Phenate of soda is placed in an apparatus fitted with exterior heating and with a stirrer capable of scraping the inner side of the vessel and the temperature is raised to 360° C. A current of steam is passed through the mass which steam may be advantageously superheated to 360–380° C. The steam carries away a small quantity of phenol formed by the hydrolysis of the phenate and one then begins to introduce the sodium benzene sulphonate while maintaining the temperature at 360–370° C.; the quantity of sulphonate corresponding to one molecule to 2 to 2.5 molecules of sodium phenate is used. The carrying away of the phenol formed takes place in a very regular manner and the operation is stopped two hours after all the sulphonate has been introduced. The proportion of phenol carried off amounts on an average to 20 to 30% of the condensed mixture.

At the close of the operation there remains in the apparatus a pasty fluid formed by the excess of molten sodium phenate containing the sulphite formed in suspension; this mixture also contains a small quantity of caustic soda set free by the partial hydrolysis of the phenate by the steam. The sulphite is separated in the usual manner by the addition of a small quantity of water and filtration while hot, and in this way the phenate used in excess is recovered in the form of aqueous solution. This solution can be concentrated and evaporated to dryness or crystallized with the object of recovering the phenate; in order to eliminate eventual impurities one can also liberate the phenol contained therein by the usual process of acidulation, as, for example, by means of carbonic acid gas or sulphur dioxide, or by benzene sulphonic acid and the phenol can be re-transformed into phenate for the subsequent operations by treatment with a suitable sodium salt in the presence of lime.

In this example the phenate used is recovered quantitatively in the form of the recovered phenate and phenol carried over. A further quantity of phenol is obtained corresponding to a yield of 92% of the theoretical based on the sulphonate used, and in addition there is a small quantity of diphenyl oxide corresponding to a yield of 4 to 6% of the sulphonate.

If instead of the foregoing proportions the quantity of sulphonate introduced into the apparatus corresponded to 1 molecule to 1 molecule of sodium phenate, the reaction mass would be pasty and would progressively be transformed into powdery sulphite. The agitation of the mass could not then be maintained until the end of the operation except by the use of a very strong plant and with a very great expenditure of mechanical energy. Furthermore, in that case the average proportion of phenol carried over would only amount to 10 to 15% of the condensed mixture.

*Example 2.*—In the same apparatus as that of Example 1, sodium phenate and sodium benzene sulphonate are introduced in the molecular proportions of 2 to 2.5 molecules of phenate to 1 molecule of sulphonate.

The mixture is heated to 365° C. while a current of dry steam which has been superheated to 360–380° C. is passed through the mass. At the beginning of the process the quantity of phenol carried over is very great and amounts to about 120 to 140 parts of phenol for 100 parts of condensed water. By degrees, as the operation continues, the amount of phenol carried over gradually diminishes and then rapidly falls; the process is then stopped.

The product remaining in the apparatus at the end of the operation is of the same composition as that of Example 1 and can be treated in the same way.

As in the preceding example, the yield of phenol on the benzene sulphonate used is excellent and the amount of dipheyl oxide produced is very slight.

The method of working described in this example can be modified and the mixture of sulphonate and of phenate in the same molecular proportions as before can be added little by little to the apparatus. These reagents can be introduced either separately in the solid or fused state or after having been previously mixed.

In working according to this last method of carrying out the process, instead of adding the materials to the apparatus described in Example 1, it is possible to work in a continuous system of feeding the reagents, either solid or fused, into a series of reaction vessels leading from one to another through which a current of steam circulates in the opposite direction to the reagents; one can also utilize a single reaction vessel in an elongated form, so that the reagents are fed into one extremity and the steam into the other extremity and in which the molten reaction mass and the steam circulate in counter-current.

*Example 3.*—In the same apparatus as that of Example 1, 1450 grams of sodium phenate and 970 grams of sodium toluenesulphonate are introduced. The mixture is heated to 370° C. while a current of dry steam which has been superheated to 360–380° C. is passed through the mass. The phenol and cresol carried over by the steam are separated in known ways from the condensed product and cresol is obtained with a yield of more than 85% of the theoretical based on the sulphonate used.

What we claim and desire to secure by Letters Patent is:—

1. A process for the preparation of phenols in which alkali metal phenates in a practically dry state are hydrolized by a current of steam at a temperature of 280–370° C., characterized by the fact that the current of steam which carries away the phenol formed is caused to pass through a fused mixture of an alkali arylsulphonate and an excess of an alkali metal phenate so that the reaction mass is maintained in a fused state throughout the operation.

2. A process for the preparation of phenols in which alkali metal phenates in a practically dry state are hydrolyzed by a current of steam at a temperature of 280–370° C., characterized by the fact that the current of steam which carries away the phenol formed is caused to pass through a fused mixture of an alkali arylsulphonate and an excess of an alkali metal phenate so that the reaction mass is maintained in a fused state throughout the operation, the molecular proportions of alkali arylsulphonate and alkali phenate used being from 2 to 2.5 to one.

3. A process for the preparation of phenols in which alkali metal phenates in a practically dry state are hydrolyzed by a current of steam at a temperature of 280–370° C., characterized by the fact that the current of steam which carries away the phenol formed is caused to pass through molten alkali metal phenate into which alkali arylsulphonate is gradually introduced, the phenate being kept in excess throughout the operation.

4. A process for the preparation of phenol in which sodium phenate in a practically dry state is hydrolyzed by a current of steam at a temperature of 280–370° C., characterized by the fact that the current of steam which carries away the phenol formed is caused to pass through a fused mixture of sodium benzene sulphonate and an excess of sodium phenate so that the reaction mass is maintained in a fused state throughout the operation.

5. A process for the preparation of phenol in which sodium phenate in a practically dry state is hydrolyzed by a current of steam at a temperature of 280–370° C., characterized by the fact that the current of steam which carries away the phenol formed is caused to pass through a fused mixture of sodium benzene sulphonate and an excess of sodium phenate so that the reaction mass is maintained in a fused state throughout the operation, the molecular proportions of sodium benzene sulphonate and sodium phenate used being from 2 to 2.5 to one.

6. A process for the preparation of phenol in which sodium phenate in a practically dry state is hydrolyzed by a current of steam at a temperature of 280–370° C., characterized by the fact that the current of steam which carries away the phenol formed is caused to pass through molten sodium phenate into which sodium benzene sulphonate is gradually introduced, the sodium phenate being kept in excess throughout the operation.

7. A process for the preparation of cresol in which sodium cresylate in a practically dry state is hydrolyzed by a current of steam at a temperature of 280–370° C., characterized by the fact that the current of steam which carries away the cresol formed is caused to pass through a fused mixture of sodium toluene sulphonate and an excess of sodium phenate so that the reaction mass is maintained in a fused state throughout the operation.

8. A process for the preparation of cresol in which sodium cresylate in a practically dry state is hydrolyzed by a current of steam at a temperature of 280–370° C., characterized by the fact that the current of steam which carries away the cresol formed is caused to pass through a fused mixture of sodium toluene sulphonate and an excess of sodium phenate so that the reaction mass is maintained in a fused state throughout the operation, the molecular proportions of sodium toluene sulphonate and sodium phenate used being from 2 to 2.5 to one.

9. A process for the preparation of cresol in which sodium cresylate in a practically dry state is hydrolyzed by a current of steam at a temperature of 280–370° C., characterized by the fact that the current of steam which carries away the cresol formed is caused to pass through molten sodium phenate into which sodium toluene sulphonate is gradually introduced, the sodium phenate being kept in excess throughout the operation.

10. A process for the preparation of naphthol in which sodium naphtholate in a practically dry state is hydrolyzed by a current of steam at a temperature of 280–370° C., characterized by the fact that the current of steam which carries away the naphthol formed is caused to pass through a fused mixture of sodium naphthalene sulphonate and an excess of sodium phenate so that the reaction mass is maintained in a fused state throughout the operation.

11. A process for the preparation of cresol in which sodium naphtholate in a practically dry state is hydrolyzed by a current of steam at a temperature of 280–370° C., characterized by the fact that the current of steam which carries away the naphthol formed is caused to pass through molten sodium phenate into which sodium naphthalene sulphonate is gradually introduced, the sodium phenate being kept in excess throughout the operation, the molecular proportions of sodium naphthalene sulphonate and sodium naphtholate used being from 2 to 2.5 to one.

12. A process for the preparation of naphthol in which sodium naphtholate in a practically dry state is hydrolyzed by a current of steam at a temperature of 280–370° C., characterized by the fact that the current of steam which carries away the naphthol formed is caused to pass through molten sodium phenate into which sodium naphthalene sulphonate is gradually introduced, the sodium phenate being kept in excess throughout the operation.

MAURICE ERNEST BOUVIER.
LOUIS DOMINIQUE BARDIN.
JEAN JACQUES CHAVAN.